United States Patent [19]
Ellis et al.

[11] Patent Number: 5,345,350
[45] Date of Patent: Sep. 6, 1994

[54] DUAL-PURPOSE PICKER FOR AUTOMATED MULTIMEDIA LIBRARY

[75] Inventors: John F. Ellis; Michael D. Osborn; Daniel J. Winarski, all of Tucson, Ariz.

[73] Assignee: International Business Machines Corporation, Armonk, N.Y.

[21] Appl. No.: 976,160

[22] Filed: Nov. 13, 1992

[51] Int. Cl.⁵ .............................................. G11B 15/68
[52] U.S. Cl. ................................................... 360/92
[58] Field of Search .............................. 360/92, 90, 93

[56] References Cited

U.S. PATENT DOCUMENTS

| | | | |
|---|---|---|---|
| 4,381,527 | 4/1983 | Titus, IV et al. | 360/92 |
| 4,937,690 | 6/1990 | Yamashita et al. | 360/92 |
| 5,029,024 | 7/1991 | Leonard et al. | 360/92 |
| 5,133,632 | 7/1992 | Aramaki et al. | 360/92 X |
| 5,237,468 | 8/1993 | Ellis | 360/92 |

*Primary Examiner*—John H. Wolff
*Attorney, Agent, or Firm*—Baker, Maxham, Jester & Meador

[57] ABSTRACT

A dual-purpose robotic picker apparatus for picking entire magazines of data storage cartridges as well as individual data storage cartridges in an automated data storage library. The multi-slot picker combines a detachable magazine and a "through-the-magazine" cartridge manipulator to function as a multi-gripper picker. A first magazine gripper acts to hold a multi-cartridge magazine. A second cartridge picker acts to move cartridges in and out of the magazine. An indexing mechanism moves the detachable magazine with respect to the cartridge gripper, permitting random access to the cartridges held within the magazine. The gripper mechanism can transport cartridges automatically within the library, either in magazines or as individual cartridges. The combination of multi-slot picking and bulk cartridge movement functions sharply increases library efficiency and data storage cartridge loading speed.

21 Claims, 9 Drawing Sheets

IBM 3495 LIBRARY

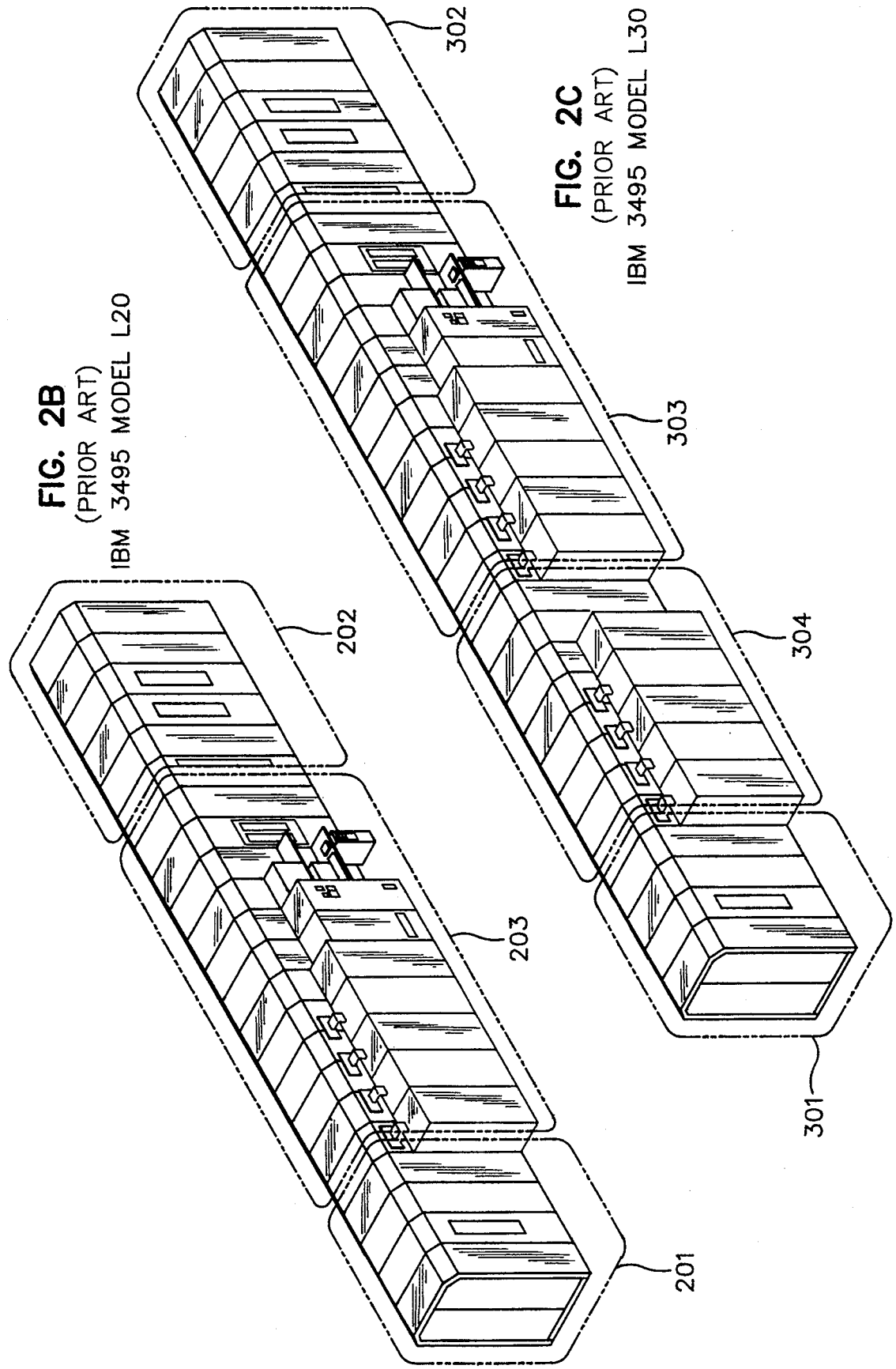
FIG. 2B (PRIOR ART) IBM 3495 MODEL L20
FIG. 2C (PRIOR ART) IBM 3495 MODEL L30

IBM 3495 MODEL L40

IBM 3495 MODEL L50

DUAL-PURPOSE PICKER FOR AUTOMATED MULTIMEDIA LIBRARY

BACKGROUND OF THE INVENTION

1. Field of the Invention

This invention relates generally to multiple cartridge magazine handling in automated data storage libraries and, more specifically, to a robotic picker for handling and transporting both individual data storage cartridges and detachable multiple cartridge magazines.

2. Discussion of Related Art

Numerous business applications require very large data stores for storing information used in large business databases. Database storage requirements often exceed 1,000 GB and data storage costs tend to relegate such large databases to low-cost magnetic tape stores. Unfortunately, such low-cost stores cannot provide efficient data access speed and reliability. Efficient access is particularly important in business applications requiring frequent updates to the database. Magnetic tape storage is particularly inefficient for frequent database updates. For example, even after a tape cartridge is loaded onto a tape drive, access to data in the mounted tape is still substantially slower than access to data stored on Direct Storage Access Devices (DASDs) or optical disks. This problem is substantially exacerbated by the additional delays associated with manually locating and mounting a requested magnetic tape cartridge.

Automated data storage libraries offer some improvements in speed and reliability for data storage and retrieval from magnetic tape cartridges and other data storage media (DSM cartridges) such as optical media. Advances in magnetic tape cartridge technology have also enhanced the efficiency of automated tape cartridge libraries.

Access time and reliability are improved by the robotic or automatic management of the storage and retrieval of tape cartridges. The typical automated cartridge library known in the art includes a plurality of bins or storage slots for passively storing resident DSM cartridges such as tape cartridges, a robotic picker mechanism, and one or more Peripheral Data Storage Device (PDSD) bays or drive slots. The robotic picker mechanism operates on command to transfer a DSM cartridge between a storage slot and a drive slot for mounting on a PDSD. This sort of automated data storage library offers many operational benefits, including greater DSM cartridge mount reliability, improved uniformity of request-to-mount time, and improved off-shift availability. Such libraries often include a manual port for inserting and removing DSMs, such as tape cartridges, from the library.

Automated data storage libraries suffer generally from one or more specific shortcomings. Although the mechanical automation improves the performance of very large databases, an automated library is disadvantaged in terms of necessary floor space, data storage capacity, data access and retrieval delays and the frequently serviced mechanisms necessary for automatic operation. Practitioners in the art have suggested various improvements to the automatic data storage library, particularly improved PDSD mounting operations and improved DSM cartridge transfer into and out of the library. These operations require improved DSM cartridge mounting and handling procedures and improved robotic picker mechanical design.

For instance, in U.S. Pat. No. 5,065,265, Michel A. Pierrat discloses an improved storage carrousel having a plurality of rotatable sub-carrousels for use in an automatic data storage library. Pierrat teaches a design for a carrousel and robotic arm for use in the library, thereby increasing a storage capacity by 30-40% without increasing the physical size of the library. His robotic picker design is smaller and lighter because his carrousel design results in less weight carried by the arm.

In Japanese patent 59-77670, Katsuyuki Obata et al disclose a new gear and cam arrangement for use in a tape cassette magazine loader and unloader. With their design, the same mechanism performs both loading and unloading, distinguishing between the two by merely switching cams. Obata et al teach a method for operating their cartridge loader/unloader with a single motor, thereby reducing the mechanism size and complexity. However, Obata et al do not consider or suggest application of their invention to an automatic data storage library, limiting their teachings to simple tape cassette magazine handlers.

More recently, in a disclosure entitled "Camera and Gripper Assembly For an Automated Storage Library", filed on Oct. 15, 1991 as patent application Ser. No. 07/776,945 now issued as U.S. Pat. No. 5,237,468, J. F. Ellis discloses an optical gripper designed for mounting at the end of a robotic arm. Ellis's gripper assembly permits pick-before-place cartridge operations to be performed with a single camera and two grippers, thereby substantially improving automatic loading and unloading efficiency. This U.S. Pat. No. 5,237,468 is entirely incorporated herein by this reference.

Practitioners have introduced the Automatic Cartridge Loader (ACL) for use in improving the efficiency of PDSD mounting procedures. The ACL is a "stacker" or serial DSM cartridge loader, as is well-known. Manufacturers such as Hitachi, IBM, HDS and Fujitsu produce automated data storage libraries including the ACL feature. All such ACLs are serial access devices.

An analogous random access DSM cartridge loader for use in automated data storage libraries is unknown in the art, perhaps because the "picker" and library DSM storage slots operate as a single large random access DSM cartridge loader. The travel time between the DSM storage slots and the input-output ports or PDSDs occupies 40-60% of the total DSM cartridge transport time. Automated libraries known in the art provide grippers having capacity to transport, at most, two DSM cartridges at a time. Most libraries that use ACLs to cache five to ten DSM cartridges at a time require that the ACL be loaded or unloaded by a DSM cartridge gripper at the rate of one DSM per gripper cycle. The Odetics intermediate library system product uses a DSM magazine to load and unload cartridges from the library, but such transfers are exclusively manual operations. The ACLs known in the art are all sequential DSM magazines that provide no means for random DSM cartridge access.

In a disclosure entitled "Multi-Media-Type Automatic Libraries", filed on Jan. 3, 1992 as patent application Ser. No. 07/816,590, J. E. Kulakowski, et al disclose a system for handling diverse and incompatible data storage media (DSM cartridges) within a single automated data storage library. This patent application Ser. No. 07/816,590 is entirely incorporated herein by this reference. Kulakowski et al teach a new library design that includes a DSM cartridge storage array having a plurality of storage receptacles for removably receiving cartridge-holding magazines. Each magazine stores a plurality of DSM cartridges in individual slots. These slots are arranged to open into the DSM transport system so that the magazines held in the storage receptacles constitute a series of DSM cartridge storage arrays for different types of DSM cartridges. Kulakowski et al teach inserting and removing DSM cartridges from the library either by manually passing individual DSM cartridges through an exterior port or by removing and inserting the entire magazine manually. Kulakowski et al do not consider dual-purpose means for automatically transporting DSM cartridges individually or in magazines internally within the automated library. Their invention is limited to a technique for loading and unloading incompatible DSM cartridge types and their magazine arrangement is limited to the purpose of segregating such incompatible DSM cartridge types.

Techniques for bulk transport of DSM cartridges and transport of trays of several cartridges each is known in the art, as discussed in the above-cited Kulakowski et al patent application. However, a method for randomly loading one of a plurality of DSMs held in a DSM magazine is neither taught nor suggested in the existing art.

There remains a clearly felt need in the art for improved data storage capacity and data access efficiency in automated data storage libraries in general and through improved automated DSM cartridge handlers or "pickers" specifically. The related problems and deficiencies are clearly felt in the art and are solved by this invention in the manner described below.

SUMMARY OF THE INVENTION

The gripper apparatus of this invention includes a first magazine gripping means for grasping at least one DSM magazine, which is capable of removably receiving several DSM cartridges. A second cartridge gripping means is provided for grasping single DSM cartridges within the magazine grasped in the magazine gripping means. Individual DSM cartridges can thereby be "pushed through" the DSM magazine of this invention such that the cartridge gripper can grasp a DSM cartridge from storage and pull it in to the DSM magazine or, conversely, grasp a DSM cartridge in the bulk magazine and push it out to load into a PDSD or an external DSM slot. The magazine gripper can be indexed relative to the cartridge gripper so that the DSM magazine can be randomly addressed by the cartridge gripper.

It is an object of this invention to reduce the total number of robotic picker transport cycles between the PDSD bay area and the DSM bin area of the automated data storage library.

It is another object of this invention to provide an automated gripper apparatus that allows for DSM cartridge transport into and out of an automated library in a DSM magazine while at the same time also permitting random access to any DSM cartridge within the DSM magazine. It is yet another object of this invention to provide an apparatus capable of random-access transfer of individual DSM cartridges from or to a DSM magazine during the magazine transport gripper movement cycle.

It is an advantage of this invention that DSM cartridges can be transferred into or out of the automated library many times more rapidly than in the existing art.

It is another advantage of this invention that the PDSD mount and demount throughput is increased substantially, especially because more than two "used" DSM cartridges can be moved back to a storage bin in a single gripper movement cycle.

It is yet another advantage of this invention that DSM cartridges can be more quickly removed from an automated library. This improvement is somewhat less substantial because the robotic picker of this invention must still move to each individual DSM cartridge for ejection. Once the bulk DSM magazine of this invention is full, however, it may then be moved directly to an output station or portal.

It is another advantage of this invention that the PDSD mount and demount time is reduced. To load the contents of the DSM magazine of this invention into an ACL at a PDSD, the existing ACL contents must be moved back to the DSM storage bin area. This may occur after loading the new DSM magazine into the ACL if there are two magazine grippers to allow swapping of magazines at the ACL. In certain situations, the mount time may only be somewhat improved by the picker of this invention because the bulk magazine of this invention may still move to each individual DSM cartridge for preload. However, once the bulk magazine of this invention is full, it may be moved directly to the PDSD in a single gripper transport cycle. This type of operation is reminiscent of "cache" operations in random access memory.

It is yet another advantage of this invention that the dual-purpose gripper concept can be applied to a variety of DSM magazine configurations, including rectilinear stacks, circular arrays or drums, and any other useful DSM magazine configurations.

It is a feature of this invention that the pick-through concept permits rapid exchange of a number of DSMs at the ACLs without repetitive gripper travel between the ACLs and the DSM storage area and without removal of the DSM magazine from the gripper at the ACL. One empty slot is of course required for such rapid exchange.

The foregoing, together with other objects, features and advantages of this invention, will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein:

FIG. 2, comprising FIGS. 2A–2E, shows several configurations for the IBM 3495 Tape Library Dataserver from the prior art;

DETAILED DESCRIPTION OF THE PREFERRED EMBODIMENTS

Figure 1:
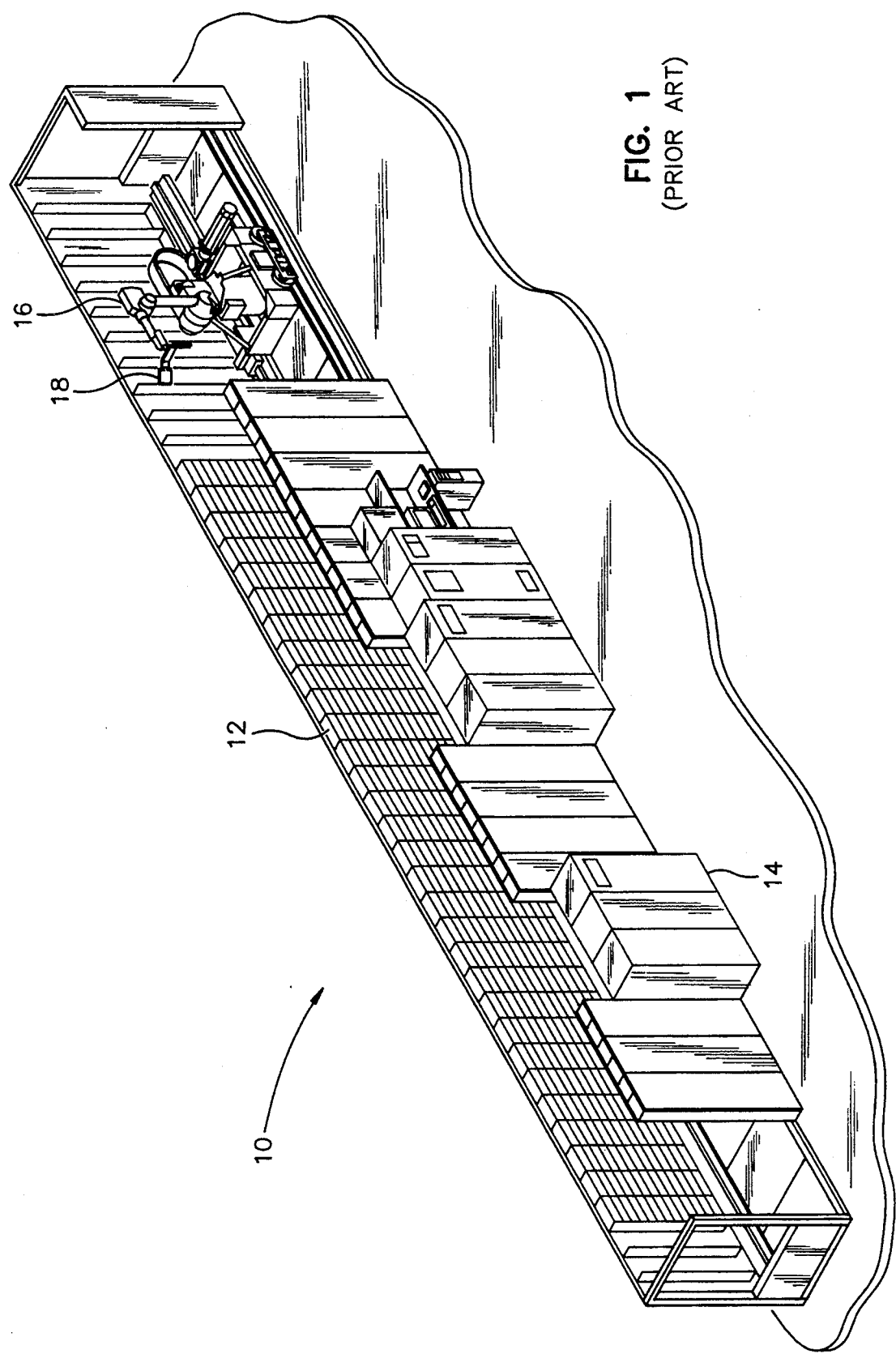
FIG. 1 shows an automated data storage library from the prior art.

FIG. 1 shows a typical automatic data storage library 10 known in the art. The essential elements of library 10 are readily apparent in FIG. 1. A plurality of Data Storage Medium (DSM) cartridge bins, exemplified by DSM bin 12, are arrayed along both interior walls of library 10. A plurality of Peripheral Data Storage Device (PDSD) cabinets are exemplified by cabinet 14. Cabinet 14 contains one or more PDSD bays (not shown) adapted to receive any one of several PDSD types known in the art, such as tape cartridge readers, optical disk transports and the like. A robotic picker apparatus 16 is disposed to move through library 10 between the two DSM cartridge storage walls. Picker 16 operates to transfer individual DSM cartridges from the storage area to the PDSD cabinets and back again under automated control. Picker 16 is equipped with one or more grippers exemplified by gripper 18.

FIGS. 2A-2E show several different configurations of the IBM 3495 automated data storage library. The several models demonstrate the typical range of library sizes known in the art. Each of the libraries in FIGS. 2A-2E include a robotic picker (not shown) similar to picker 16 in FIG. 1.

Figure 2A:
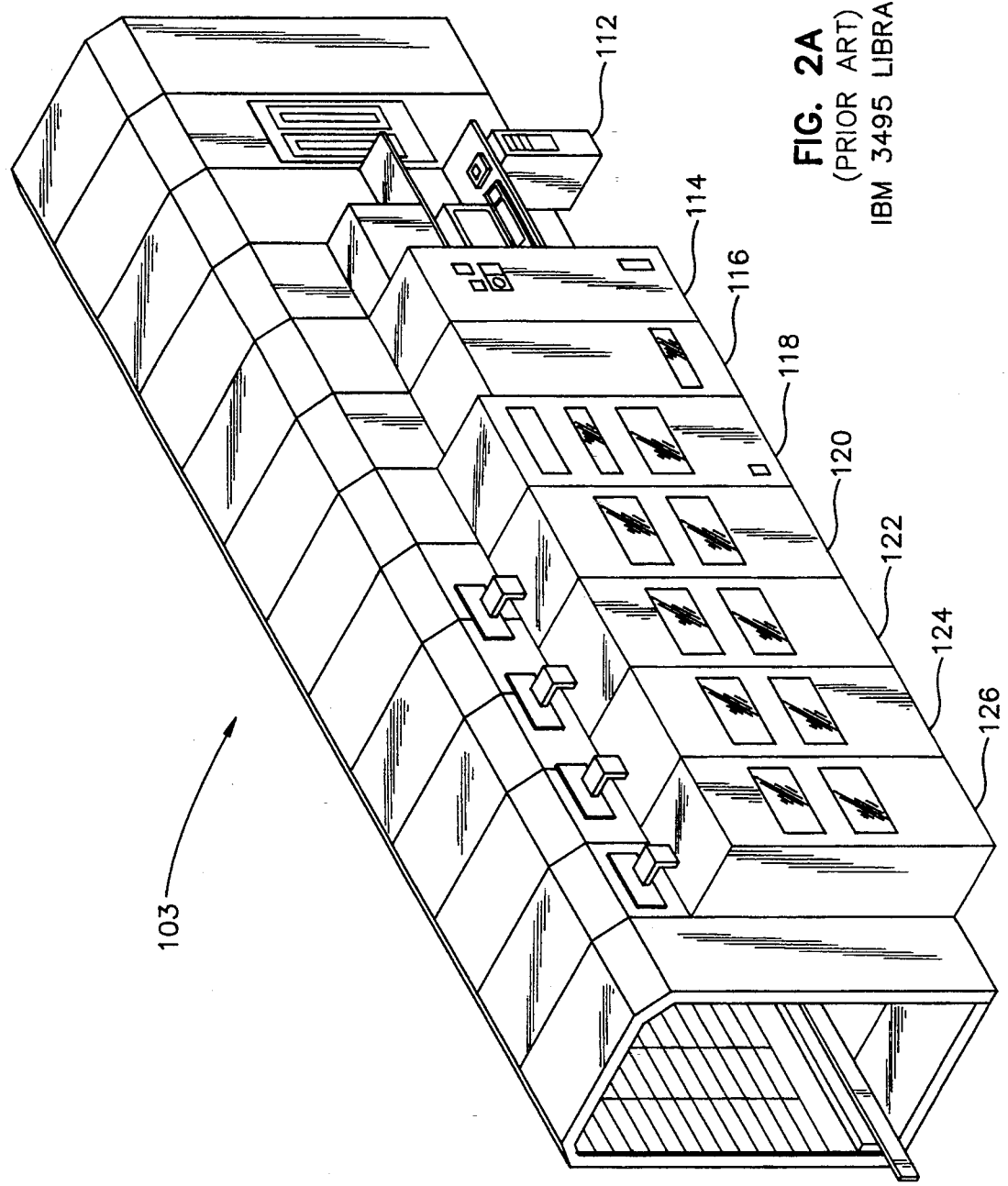

FIG. 2A shows a schematic representation of the IBM 3495 library control bay 103. Control bay 103 consists of the library manager system 112, shown as a PS/2 processor, the robotic picker control cabinets 114 and 116, the PDSD control cabinet 118, and the PDSD cabinets 120, 122, 124 and 126.

FIG. 2B shows the IBM 3490 model L20, which includes a control bay 203 coupled to an operator bay 201 and a service bay 202. FIG. 2C shows the IBM 3495 model L30, which is identical to model L20 (FIG. 2B) except for the addition of a PDSD module 304. PDSD module 304 is identical to control bay 303 without the picker control unit (cabinets 114 and 116 in FIG. 2A) and the library manager (manager 112 in FIG. 2A).

Figure 2D:
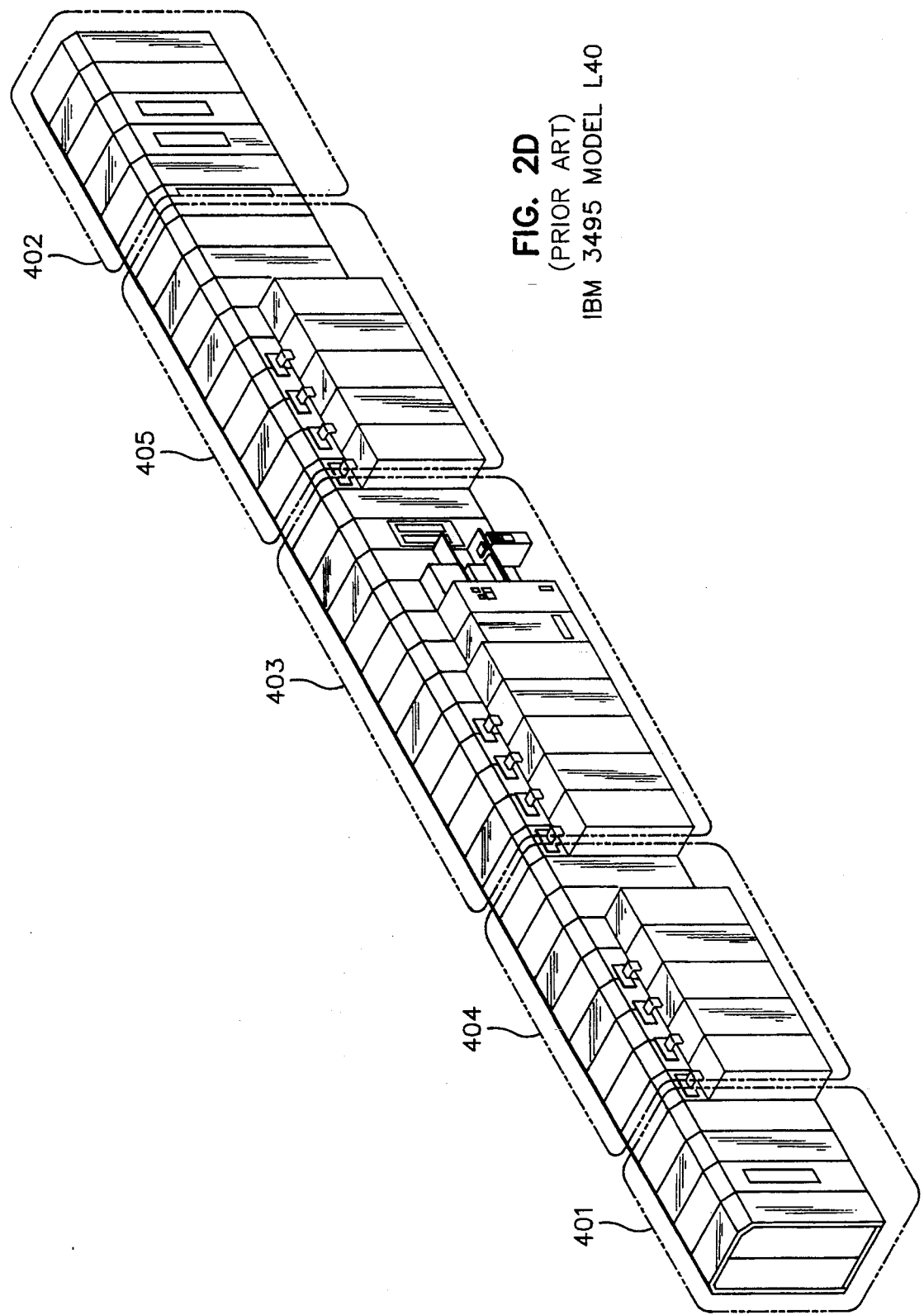
Figure 2E:
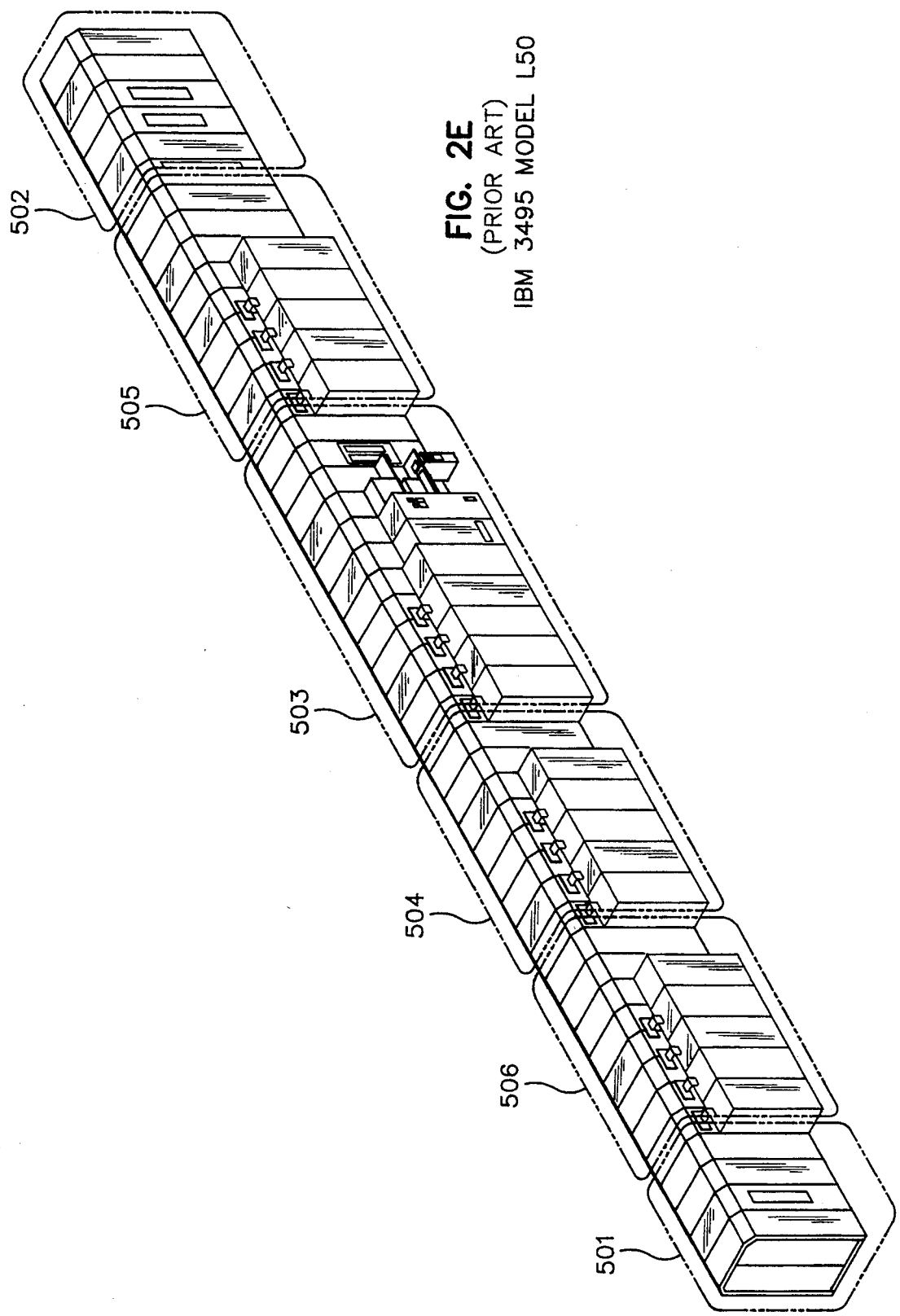

FIG. 2D shows a schematic diagram of the IBM 3495 model L40, which is identical to model L30 except for an additional PDSD module 405. Adding a third PDSD module 506 to model L40 results in the IBM 43195 model L50 shown in FIG. 2E. Model L50 contains 400% of the PDSD capacity of model L20 (FIG. 2B).

Figure 3:
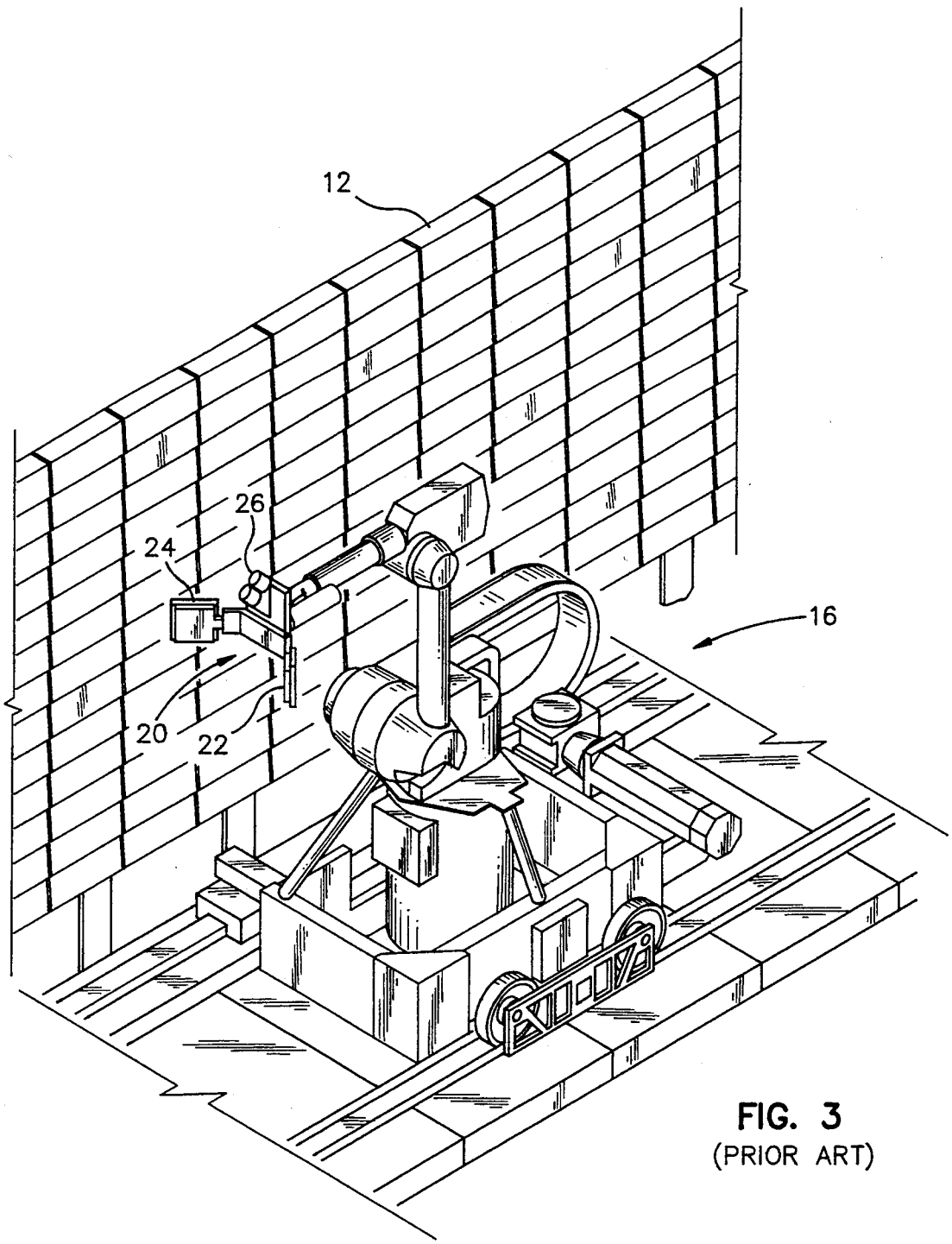
FIG. 3 shows a robotic "picker" assembly from the prior art.

FIG. 3 illustrates a typical robotic picker apparatus 16 known in the prior art. For the purpose of this disclosure, only the gripper assembly 20 is of interest. In FIG. 3, gripper assembly 20 includes the two cartridge grippers 22 and 24 and the optical sensor assembly 26. Grippers 22 and 24 each operate to grasp and transport a single DSM cartridge in a manner well-known in the art. Because dual gripper assembly 20 can simultaneously grasp two such DSM cartridges (not shown), picker 16 can pull one DSM cartridge and replace it with a second DSM cartridge at any particular location in a single cycle as is well-known in the art.

The Dual-Purpose Picker Invention

Figure 4:
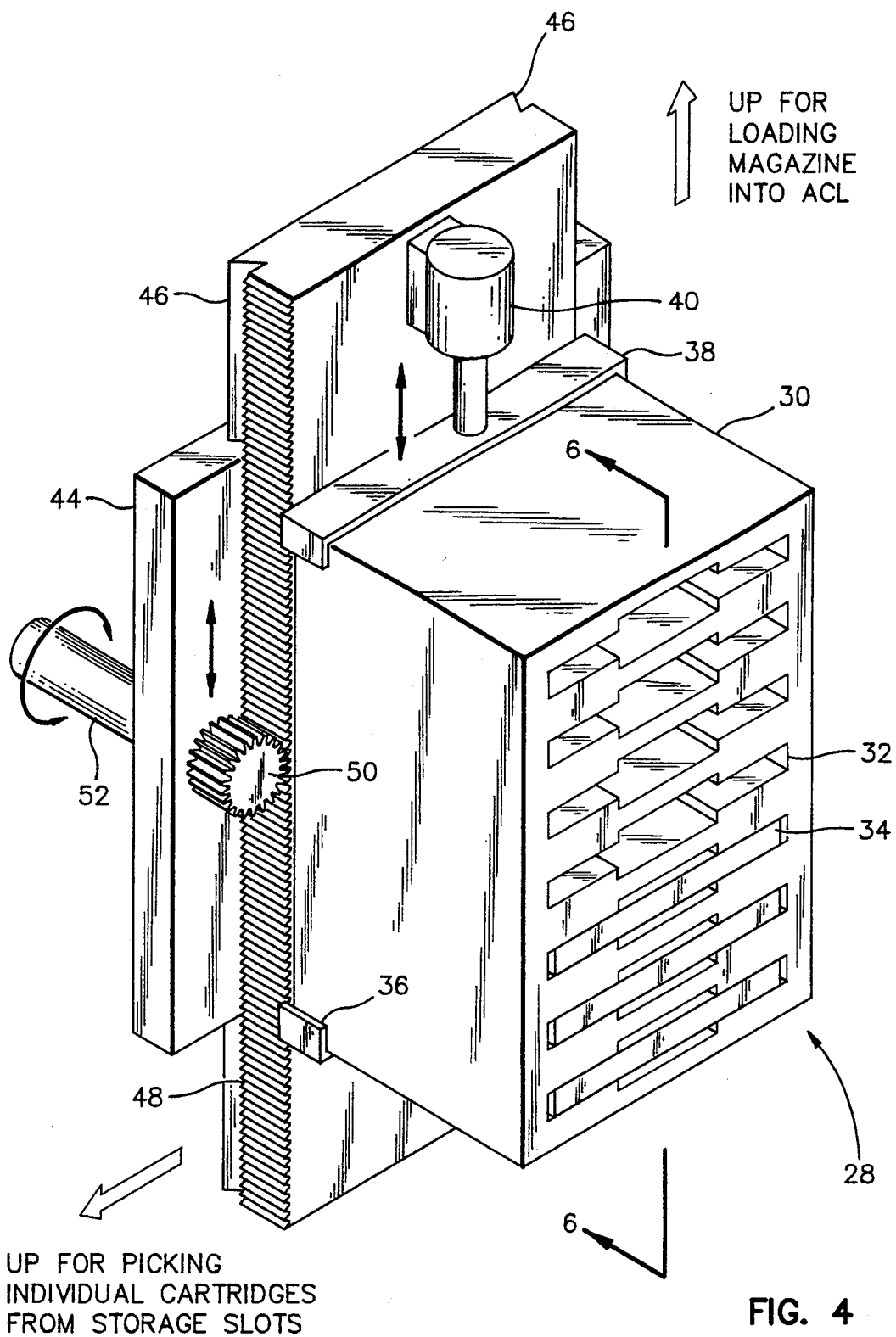
FIG. 4 illustrates the dual-purpose gripper apparatus of this invention.

In FIG. 4, shows the library gripper mechanism 28 of this invention schematically. Mechanism 28 can grip DSM magazines (DSMMs) each holding a plurality of DSM cartridges. FIG. 4 shows an illustrative DSM magazine 30 having seven DSM slots exemplified by the empty DSM slot 32. The lower three slots are shown loaded with illustrative DSM cartridges exemplified by the DSM cartridge 34.

Mechanism 28 uses a gripping arrangement to grasp DSM magazine 30 between a lower gripper bar 36 and a movable upper gripper bar 38. Upper gripper bar 38 is raised and lowered by means of a linear actuator 40, which may be a simple solenoid or other useful mechanism known in the art. Lower gripper bar 36 and linear actuator 40 are mounted on a movable backplate 42. Backplate 42 is shown slideably engaged in a base plate 44 by means of the dovetail edges 46. One side edge 48 of backplate 42 is provided with a series of gear teeth and is disposed to engage a gear wheel 50. Gear wheel 50 is coupled to a rotary actuator shaft 52, which is turnably captured in base plate 44.

Accordingly, slot 32 can be indexed to any vertical position relative to base plate 44 merely by turning actuator shaft 52 as necessary. Moreover, mechanism 28 may be disposed vertically for loading DSM magazine 30 into a Automatic Cartridge Loader (ACL) or the like and also may be disposed horizontally for picking individual DSM cartridges from DSM storage slots merely by rotating base plate 44 about a normal axis. Mechanism 28 is coupled to the picker robot control arm (not shown) in any useful manner such as shown for dual gripper assembly 20 (FIG. 3). Actuator shaft 52 is turned under control of a mechanism (not shown) coupled to or contained in the picker robot control arm in any useful manner known in the art.

Figure 5:
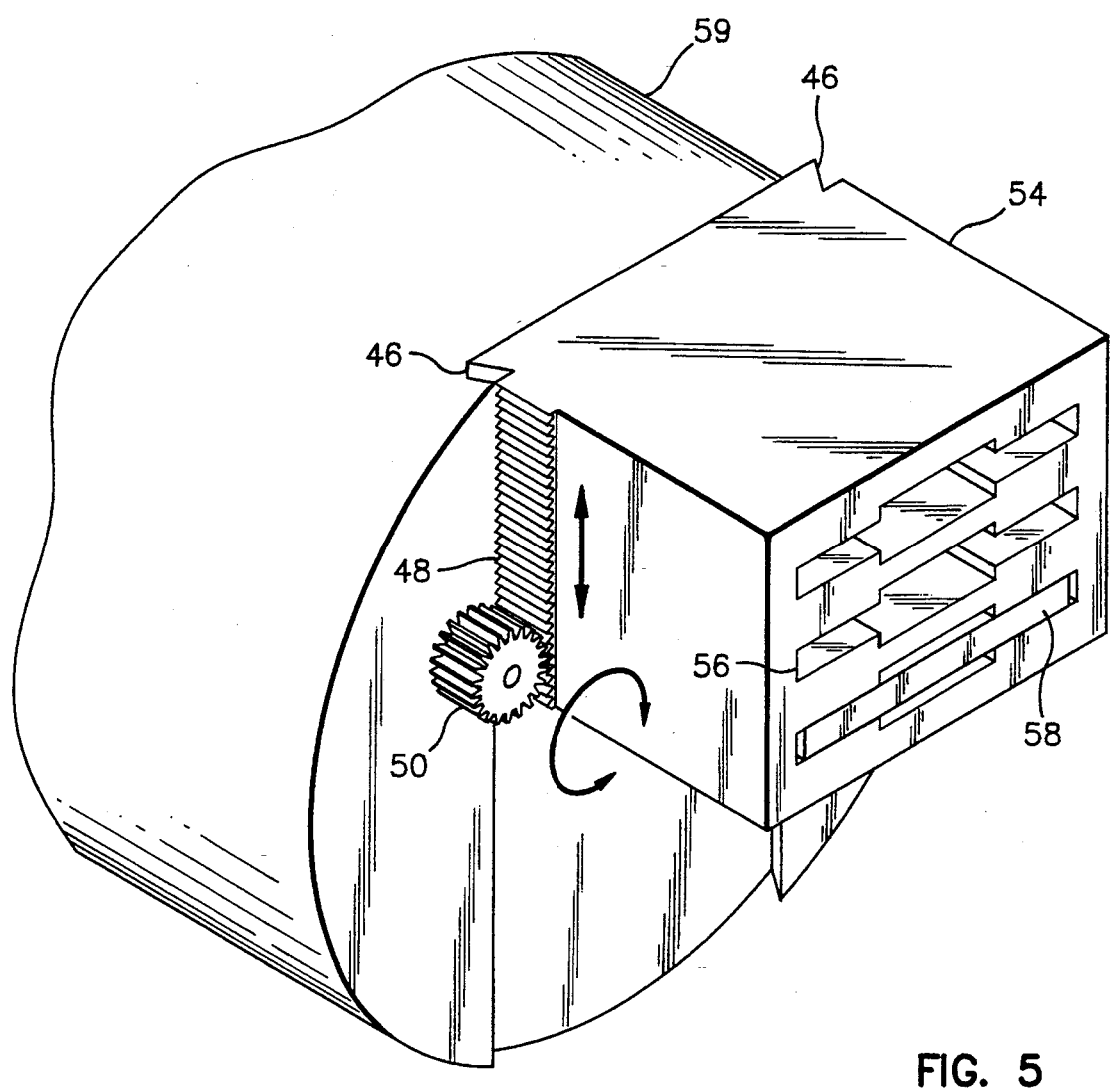
FIG. 5 shows an alternative illustrative embodiment of the dual-purpose gripper of this invention.

FIG. 5 shows another illustrative embodiment of a single-purpose DSM magazine 54 permanently coupled to picker arm 59 and having only three DSM slots exemplified by the DSM slot 56. Each such DSM slot receives one DSM cartridge exemplified by the DSM cartridge 58. Gear teeth 48 and gear wheel 50 are also shown schematically as are dovetail edges 46. The function of baseplate 44 (FIG. 4) is performed by the end of a picker robot control arm 59, which permanently engages DSM magazine 54 in this illustration.

Figure 6:
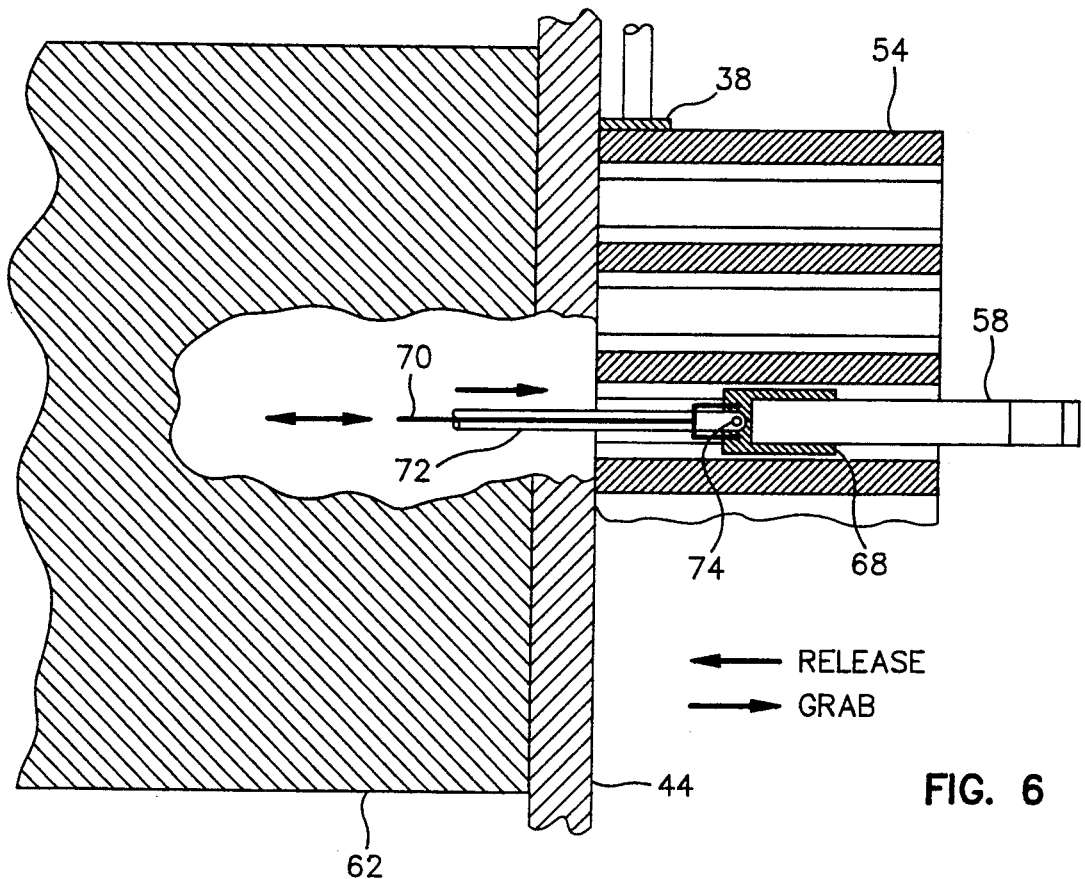
FIG. 6 shows an illustrative embodiment of the "pick-through" cartridge gripper of this invention.

FIG. 6 shows the "pick-through" DSM cartridge gripper 60 of this invention. FIG. 6 can be appreciated as a cross-sectional view through yet another gripper embodiment similar to that in FIG. 4. Gripper 60 is controlled by means of linkages attached to control mechanisms (not shown) coupled to or contained within the robot arm 62 in any useful manner known in the art. Gripper 60 operates through an aperture in base plate 44 as shown.

Gripper 60 includes of a gripping device 64 consisting of two jaws 66 and 68 that are opened and closed responsive to changes in the relative linear positions of the two control shafts 70 and 72. Jaws 66 and 68 are coupled at a hinge 74. Gripper 60 is moved in and out relative to base plate 44 by means of linkages (not shown) attached to control shafts 70 and 72 or in any other useful manner known in the art. Accordingly, in operation, gripper 60 can grip DSM cartridge 58 and pull it into a slot in DSM magazine 54 or push it out of slot 56 into an external slot or PDSD (not shown). Control shafts 70 and 72 are more than twice as long as the depth of DSM magazine 54 so that DSM cartridge 58 can be individually received into DSM magazine 54 while grasped between upper jaw 66 and lower jaw 68.

Figure 7:
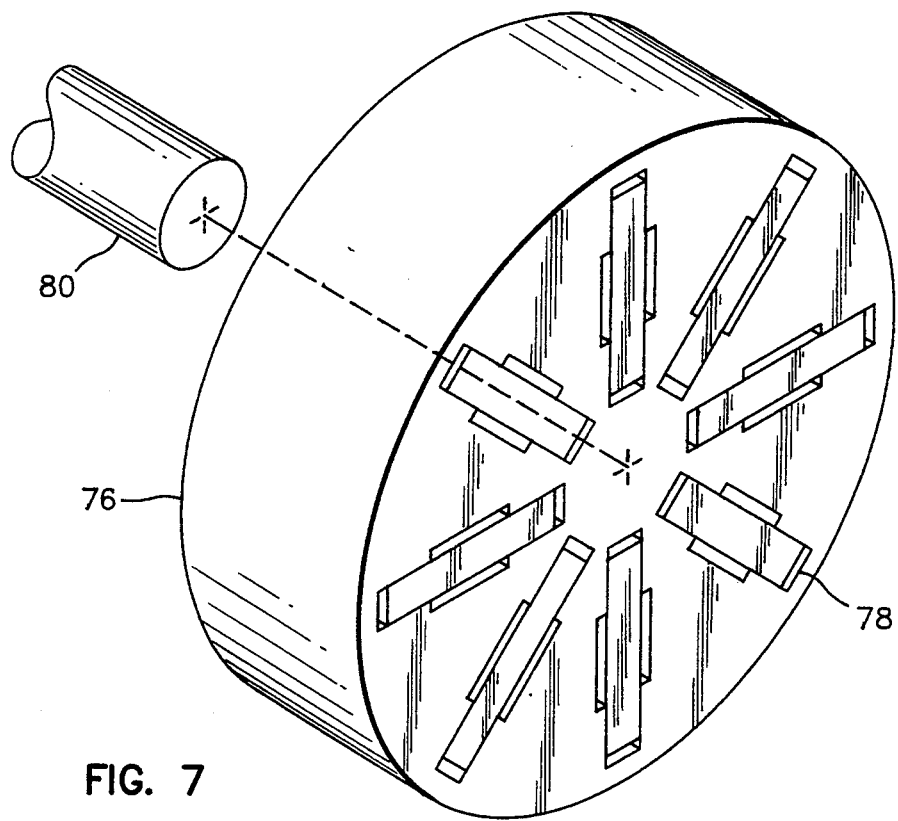
FIG. 7 shows an illustrative embodiment of the magazine of this invention having rotational symmetry.
Figure 1:
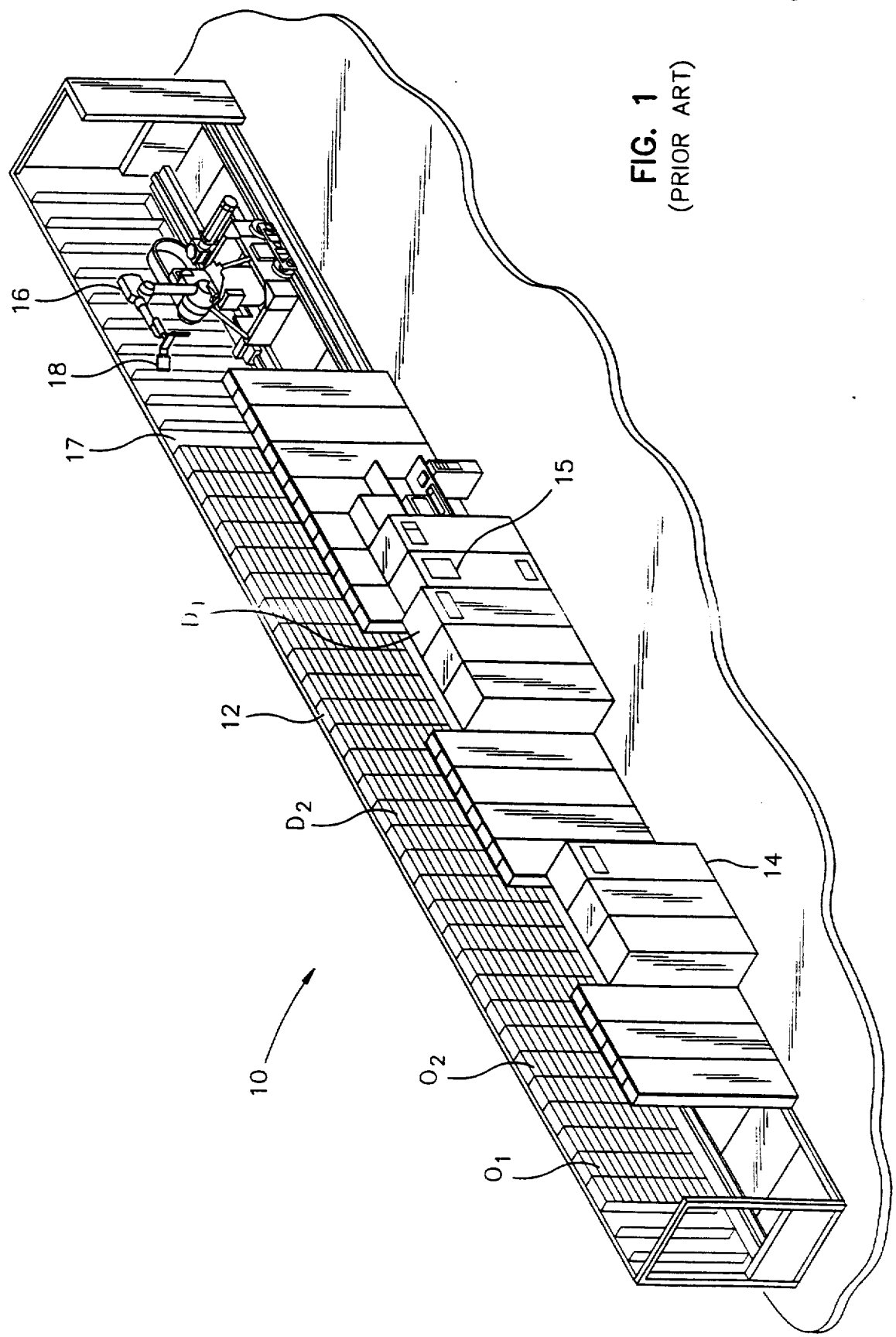
Figure 2A:
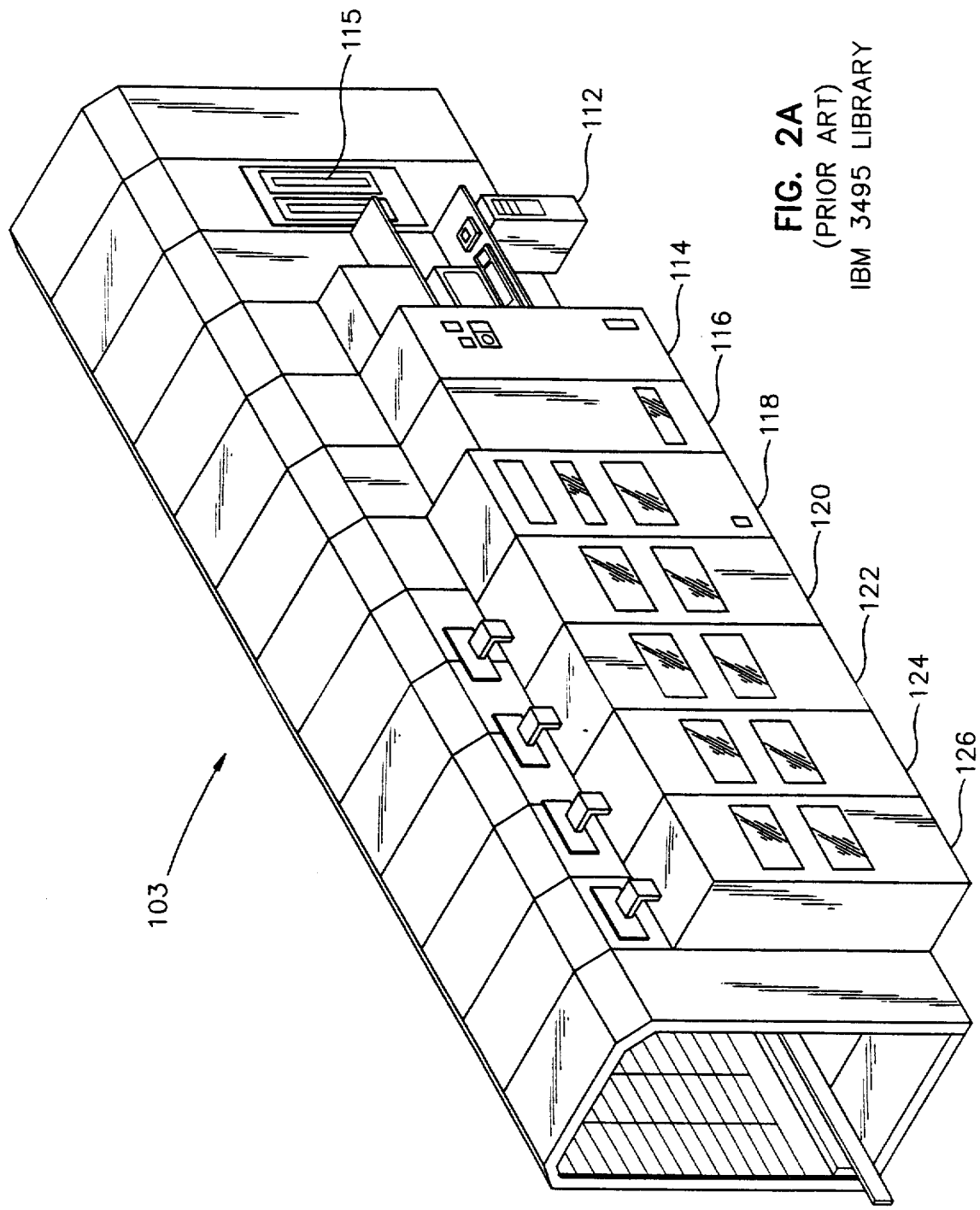

FIG. 7 illustrates yet another alternative DSM magazine design suitable for use with the dual-purpose picker mechanism of this invention. The DSM magazine 76 contains eight DSM slots exemplified by DSM slot 78.

These slots are disposed in a rotationally-symmetric configuration and may be indexed with respect to pick-through gripper 60 (FIG. 6) by means of the rotary actuator shaft 80 in any useful manner known in the art.

Figure 8:
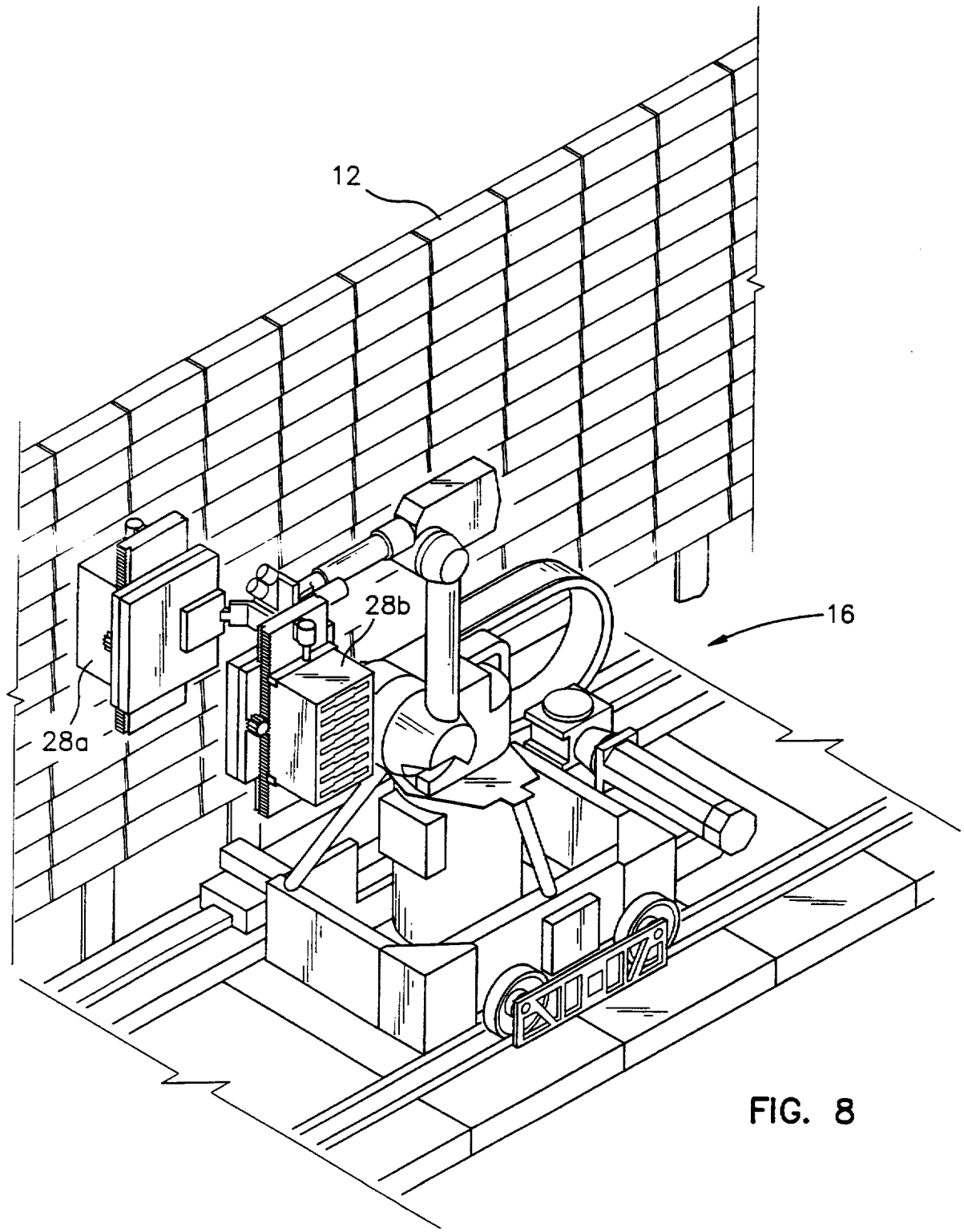
FIG. 8 shows an illustrative embodiment of the robotic "picker" assembly of this invention equipped with two of the dual-purpose grippers of FIG. 4.

FIG. 8 shows an illustrative embodiment of the robotic picker of FIG. 3 incorporating the two dual-purpose pickers 28A-B, each the same as picker 28 from FIG. 4. Each of the two pickers 28A-B in FIG. 8 operate as discussed herein in connection with FIGS. 4-7.

The picker mechanism 28 of this invention (FIG. 4) operates in two modes. The "bulk" mode refers to the group transfer of DSM cartridges in DSM magazines between library areas such as the DSM input/output ports or mail slots (e.g., port 15 in FIG. 1), the DSM storage areas 12 (FIG. 1), the interlibrary pass-through ports (e.g., ports 115 in FIG. 2A) and the PDSD ACLs (e.g., ACL bay 117 in FIG. 2A). The "random access" mode refers to moving individual DSM cartridges between these several locations. The combination of the multi-slot picker function with the bulk movement of DSM cartridges gives improved performance and flexibility in selecting the optimum sequence for a library operation. The flexibility and performance advantages of each mode are discussed below for various library functions.

Bulk Mode Cartridge Transfer Cartridge Operation

The bulk mode operation of this invention uses mechanism 28 in FIG. 4 to move entire DSM magazines loaded with DSM cartridges. The capability to pick and transport magazines allows bulk input/out and operations and bulk mount operations to be performed by robotic picker apparatus 16 (FIG. 1).

A bulk input/output operation permits entire magazines of DSM cartridges to be picked from an input port 15 (FIG. 1) and stored intact at magazine bin 17 in library 10 without the need for manipulating individual DSM cartridges. For an N-cartridge magazine, a single operation to pick the DSM magazine and store it at bin 17 on the library wall replaces the N individual cartridge pick and store operations required in the prior art.

In a bulk Automatic Cartridge Loader (ACL) mount operation, this invention permits the same DSM magazine used in transportation and storage of DSM cartridges to be used directly at the PDSDs as a magazine loader or ACL by library 10. This permits a synergistic interaction between DSM magazine and ACL for significantly improved performance. DSM magazines, holding N DSM cartridges each, may be picked from the storage area and mounted on a PDSD in a dual-purpose ACL mechanism based on this invention. In this mode, each ACL becomes a small library that is not limited to the sequential access mode of the prior art but may also operate as a random access PDSD loader that is serviced by the robotic picker apparatus 16 in accordance with a DSM magazine mount/dismount function of the dual-mode picker of this invention.

Because an ACL can more quickly mount and dismount a DSM cartridge on a PDSD than can the larger robotic picker apparatus 16 and there could be more than N ACLs serviced by picker apparatus 16, it is preferable for picker apparatus 16 to service each ACL with N DSM cartridges at a time instead of servicing each ACL with one DSM cartridge at a time as is the procedure known in the art.

For example, consider an automatic tape library with 64 PDSDs, each serviced by a dual-purpose random access ACL based on this invention. If each ACL magazine held N DSM cartridges (N=10), then the library subsystem could have 640 DSM cartridges in a "near line" status wherefrom each DSM cartridge may be more quickly mounted than might a DSM cartridge stored in the DSM storage area. For the general case, the performance improvement resulting from this configuration is determined by the probability that a given DSM mount request will be contained in one of the DSM cartridges mounted in an ACL. Thus, these PDSD-mounted ACL magazines are very similar in principle to a high-speed cache. If the library application has a set of DSM cartridges that are More Frequently Used (MFU) than others, then it is preferred that these be assembled in DSM magazines and mounted in PDSD ACLs to yield a significant performance improvement. Such performance improvement is also realized for multi-volume data set operations and for the mounting of scratch tapes. Once mounted in an ACL, the DSM magazine contents are cycled through the PDSD quickly and independently of the main robotic picker apparatus 16.

The statistical residency time of a full DSM magazine on a PDSD is N times that of a single DSM cartridge, significantly reducing the workload on the robotic picker for these applications. This reduces the queue time for "random access" operation of picker apparatus 16.

During periods of relative quiescence, picker apparatus 16 may be employed to load blank DSM cartridges into empty DSM magazines using "through-the-magazine" gripper 60 (FIG. 6) so that a fresh magazine of scratch tapes is always readily available. Also, for additional library performance improvement, More Frequently Used DSM cartridges and DSM cartridges slated for pass-through or export may be aggregated in respective DSM magazines during such quiescent periods.

Moving DSM cartridges between the input/output ports and storage cells or ACLs is extremely useful for cycling of library vault storage. Even if merely ten DSM cartridges are stored in a single DSM magazine, a single robotic picker apparatus 16 fetching a whole DSM magazine at a time can cycle the vault storage at a rate in excess of 1,000 DSM cartridges per hour.

Random Access Mode Operation Performance

The random access mode of this invention uses "through-the-magazine" DSM cartridge gripper 60 (FIG. 6) to swap DSM cartridges between a DSM magazine being grasped by mechanism 28 (FIGS. 4 or 8) and the DSM storage area or the DSM magazines already held by ACLs at the PDSDs. Thus, in this random access mode, a DSMM held by the library picker mechanism acts as a multi-slot staging area for individual DSM cartridge pick and put operations. The single-purpose embodiment in FIG. 5 is suitable for multi-slot staging only, for example.

To implement random access input/output procedures for importing DSM cartridges into the library, picker 28 can pick a DSM magazine filled with DSM cartridges from the I/O port 115 (FIG. 2A). Using pick-through gripper 60, individual DSM cartridges may then be pushed through this DSM magazine into available DSM slots in either (a) the storage area for individual DSM cartridges, (b) empty slots in other DSM magazines in storage or (c) empty slots in DSM magazines already mounted in ACLs at the PDSDs.

The existing art requires the main picker 28 to return to the I/O port 15 (FIG. 1) after every one or perhaps two DSM cartridges are stored. The dual-purpose picker of this invention eliminates the requirement for returning to the I/O port 15 (FIG. 1) until all DSM cartridges contained in the DSM magazine have been off-loaded in library. For example, to randomly export DSM cartridges with this invention, an export DSM magazine is picked from either an "empty magazine" storage area within the library or from the I/O port 15. This empty DSM magazine is then used to collect individual DSM cartridges for export. Under software control, picker 28 (FIG. 8) is moved to the locations of the desired DSM cartridges (e.g., $O_1$ and $O_2$ in FIG. 1), preferably through a procedure that minimizes robotic motion by picking the DSM cartridges in an efficient order. Pick-through gripper 60 then reaches through the export DSM magazine, removes the DSM cartridge from the storage slot or other DSM magazine slot, and retracts that DSM cartridge into an empty slot in the export DSM magazine. Picker 28 may then continue on to successive DSM cartridge locations (e.g., PDSD bays at $D_1$ in FIG. 1) without returning to the I/O port 15 (FIG. 1) until all DSM cartridges have been picked or the DSM magazine is full. Picker 28 eventually returns to the I/O port 15 (FIG. 1) and exports the entire DSM magazine so that it can be removed from the library. This procedure eliminates traveling back and forth to the I/O port 15 (FIG. 1) for each DSM cartridge because the main picker 28 returns only after all DSM cartridges have been picked or the DSM magazine is full.

Similar procedures can also be applied to pass-through operations between libraries. Once the required set of DSM cartridges is collected in an export DSM magazine as described above, the DSM magazine is placed in a pass-through port 15. This pass-through port could rotate the export DSM magazine by 180° about the vertical axis to dispose it for import by the main picker 28 of the receiving library.

An empty DSM magazine held by gripper bars 36 and 38 (FIG. 4) may also act as a multi-gripper picker useful for random access mounts and dismounts. In such an operation, picker 28 travels to the locations of DSM cartridges to be fetched, picks individual DSM cartridges through the DSM magazine using pick-through gripper 60 and stores the DSM cartridges in the slots. Picker 28 may begin to travel toward the target ACL or PDSD and may pick other DSM cartridges for random mounting along the way. One of the slots can be left vacant so that an inactive DSM cartridge from a fully loaded ACL can be removed to make space for inserting newly requested DSM cartridge mounts. Thus, the randomly-fetched DSM cartridges can be individually loaded into a plurality of ACLs without swapping DSM magazines. The gripper embodiment in FIG. 5 is also well-suited for such an operation.

When such a process is completed, any DSM cartridges dismounted from ACLs to make space for new PDSD mount requests can be returned to individual storage slots in the library (e.g., Origination $O_1$, Origination $O_2$ or Destination $D_2$ in FIG. 1) using pick-through gripper 60 (FIG. 6) or the entire DSM magazine may be deposited in a magazine storage area (e.g., magazine bin 17 in FIG. 1). This basic operational procedure can be applied to mount/dismount operations from PDSDs, to storage cells or DSM magazines, to I/O cells or DSM magazines, to pass-through DSM magazines, and to random access ACLs attached to PDSDs.

To service individual DSM cartridges in DSM magazines already mounted on ACLs, existing software may be used to unload the Least Recently Used (LRU) inactive DSM cartridge from an ACL after "X" seconds of inactivity. This procedure creates an available empty DSM slot in DSM magazines mounted in ACLs so that a "swap" is unnecessary in response to a new PDSD mount request in that DSM magazine.

Because each ACL services only one PDSD at a time, it is probably preferred to move some of the queued DSM cartridges to inactive ACLs using the dual-purpose picker of this invention. Library response time can be improved on the average by using empty ACL magazine slots to move queued DSM cartridges from the ACLs of highly active PDSDs to the ACLs of relatively inactive PDSDs. Alternatively, individual DSM cartridges (e.g., from Originations $O_1$ and $O_2$ in FIG. 1) may be gathered into a single DSM magazine and mounted together into an empty ACL. This ACL may be emptied by unloading the inactive DSM magazine from the LRU ACL after "X" seconds of inactivity, using existing software. This creates an empty ACL in anticipation of subsequent random DSM magazine mounts.

This invention offers significant performance advantages associated with moving or mounting entire magazines of cartridges. The bulk mode of operation combined with the ability to manipulate cartridges individually acts to improve library response time. Existing LRU algorithms for individual DSM cartridges and mounted DSM magazines may also be usefully applied with the method of this invention.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. In an automated data storage library having a plurality of Data Storage Media cartridges each located in a storage bin and having one or more internal Peripheral Data Storage Devices for reading from and writing to said cartridges and having at least one dual-purpose robotic picker for transporting one or more said cartridges between said storage bins and said internal storage devices, a machine-implemented method for transporting said cartridges comprising the unordered steps of:

(a) loading a first plurality of said cartridges into a detachable Data Storage Media Magazine;
   (b) grasping said detachable magazine;
   (c) moving said detachable magazine to a first destination location;
   (d) unloading at least one of said first plurality of cartridges from a position in said detachable magazine into a slot at said first destination location;
   (e) moving said detachable magazine to a second destination location; and
   (f) unloading at least one of said first plurality of cartridges into a slot at said second destination location.

2. The method of claim 1 wherein said loading step (a) includes the unordered steps of:

(a.1) loading at least one of said first plurality of said cartridges into said detachable magazine at a first origination location;

(a.2) moving said detachable magazine to a second origination location; and (a.3) loading at least one of said first plurality of said cartridges into said detachable magazine at said second origination location.

3. The method of claim 2 wherein said first plurality of said cartridges are loaded during said loading step (a) or unloaded during said unloading steps (d) and (f) in a sequence different from the sequence in which said cartridges are disposed in said detachable magazine.

4. An automated data storage library having a robotic picker, one or more drive bays each disposed for receiving at least one internal Peripheral Data Storage Device for reading a Data Storage Medium cartridge mounted thereon and a plurality of magazine bays each disposed for receiving one or more detachable data storage media magazines each having a plurality of cartridge storage slots each disposed to receive at least one said cartridge, said robotic picker comprising:

first magazine gripping means for grasping a first said detachable magazine;

cartridge gripping means coupled to said first magazine gripping means for grasping a first said cartridge within a selected said storage slot in said first detachable magazine;

cartridge indexing means coupled to said first magazine gripping means for aligning said cartridge gripping means with said selected storage slot in said first detachable magazine; and location indexing means coupled to said cartridges gripping means for transferring said first cartridge between said first detachable magazine and another location.

5. The automated data storage library of claim 4 wherein said robotic picker further comprises:

second magazine gripping means for grasping a second said detachable magazine; and magazine indexing means for exchanging the positions of said first detachable magazine and said second detachable magazine.

6. The automated data storage library of claim 5 wherein said first magazine gripping means and said second magazine gripping means are each adapted to grasp an ACL magazine.

7. The automated data storage library of claim 4 wherein said first magazine gripping means is adapted to grasp an Automatic Cartridge Loader (ACL) magazine.

8. The automated data storage library of claim 4 wherein said plurality of storage slots in said first detachable magazine are disposed in a rotationally symmetric configuration.

9. The automated data storage library of claim 4 wherein said plurality of storage slots in said first detachable magazine are disposed in a rectilinear configuration.

10. In an automated data storage library, a robotic picker for transporting one or more data storage medium cartridges from an origination location to a destination location, said picker comprising:

first magazine gripping means for grasping a first detachable magazine, said first detachable magazine having a plurality of storage slots each disposed to receive at least one said cartridge;

cartridge gripping means coupled to said first magazine gripping means for grasping a first said cartridge within a selected said storage slot in said first detachable magazine;

cartridge indexing means coupled to said first magazine gripping means for aligning said cartridge gripping means with said selected storage slot in said first detachable magazine; and location indexing means coupled to said cartridge gripping means for transferring said first cartridge between said first detachable magazine and another location.

11. The robotic picker of claim 10 further comprising:

second magazine gripping means for grasping a second said detachable magazine; and magazine indexing means for exchanging the positions of said first detachable magazine and said second detachable magazine.

12. The automated data storage library of claim 11 wherein said first magazine gripping means and said second magazine gripping means are each adapted to grasp an ACL magazine.

13. The automated data storage library of claim 10 wherein said first magazine gripping means is adapted to grasp an Automatic Cartridge Loader (ACL) magazine.

14. The robotic picker of claim 10 wherein said plurality of storage slots in said first detachable magazine are disposed in a rotationally symmetric configuration.

15. The automated data storage library of claim 10 wherein said plurality of storage slots in said first detachable magazine are disposed in a rectilinear configuration.

16. An automated data storage library having a robotic picker, one or more internal Peripheral Data Storage Devices for reading a Data Storage Medium cartridge mounted thereon and one or more detachable magazines each having a plurality of storage slots each disposed to receive at least one said cartridge, said robotic picker comprising:

first magazine gripping means for grasping a first said detachable magazine;

cartridge gripping means coupled to said first magazine gripping means for grasping a first said cartridge within a selected said storage slot in said first detachable magazine;

cartridge indexing means coupled to said first magazine gripping means for aligning said cartridge gripping means with said selected storage slot in said first detachable magazine; and location indexing means coupled to said cartridge gripping means for transferring said first cartridge between said first detachable magazine and another location.

17. The automated data storage library of claim 16 wherein said robotic picker further comprises:

second magazine gripping means for grasping a second said detachable magazine; and magazine indexing means for exchanging the positions of said first detachable magazine and said second detachable magazine, 18. The automated data storage library of claim 17 wherein said first magazine gripping means and said second magazine gripping means are each adapted to grasp an ACL magazine.

19. The automated data storage library of claim 16 wherein said first magazine gripping means is adapted to grasp an Automatic Cartridge Loader (ACL) magazine.

20. The automated data storage library of claim 16 wherein said plurality of storage slots in said first detachable magazine are disposed in a rotationally symmetric configuration.

21. The automated data storage library of claim 16 wherein said plurality of storage slots in said first detachable magazine are disposed in a rectilinear configuration.

* * * * *

UNITED STATES PATENT AND TRADEMARK OFFICE
CERTIFICATE OF CORRECTION

PATENT NO.  : 5,345,350

DATED       : September 6, 1994

INVENTOR(S) : Ellis et al.

It is certified that error appears in the above-identified patent and that said Letters Patent is hereby corrected as shown below:

Fig. 2A, please add numerals --115-- and --117-- substantially as shown on the attached page.

Fig. 1, please add numerals --15--, --17--, --$O_1$--, --$O_2$--, --$D_1$--, and --$D_2$-- as shown on attached page.

Fig. 8, please add this figure to the drawings.

Signed and Sealed this

Thirty-first Day of January, 1995

Attest:

BRUCE LEHMAN

*Attesting Officer*      *Commissioner of Patents and Trademarks*

IBM 3495 LIBRARY